United States Patent
Wehler

(10) Patent No.: US 8,468,748 B2
(45) Date of Patent: Jun. 25, 2013

(54) SLIDING DOOR SYSTEM FOR A VEHICLE IN PARTICULAR FOR A MOTOR VEHICLE WITH AN ENERGY SUPPLY GUIDE CHAIN

(75) Inventor: Herbert Wehler, Neunkirchen (DE)

(73) Assignee: Tsubaki Kabelschlepp GmbH, Wenden (DE)

( * ) Notice: Subject to any disclaimer, the term of this patent is extended or adjusted under 35 U.S.C. 154(b) by 190 days.

(21) Appl. No.: 10/571,880

(22) PCT Filed: Sep. 10, 2004

(86) PCT No.: PCT/EP2004/010116
§ 371 (c)(1),
(2), (4) Date: Nov. 3, 2006

(87) PCT Pub. No.: WO2005/033457
PCT Pub. Date: Apr. 14, 2005

(65) Prior Publication Data
US 2007/0107312 A1    May 17, 2007

(30) Foreign Application Priority Data
Sep. 16, 2003   (DE) .................. 103 43 029

(51) Int. Cl.
*E05F 11/04*   (2006.01)

(52) U.S. Cl.
USPC ............................. 49/360; 296/155; 174/72 A

(58) Field of Classification Search
USPC .................. 49/360, 209; 296/155; 174/72 A
See application file for complete search history.

(56) References Cited

U.S. PATENT DOCUMENTS

| 4,625,507 | A | 12/1986 | Moritz et al. | |
|---|---|---|---|---|
| 5,048,283 | A | 9/1991 | Moritz et al. | |
| 5,201,885 | A | 4/1993 | Wehler et al. | |
| 6,065,278 | A | 5/2000 | Weber et al. | |
| 6,152,519 | A | 11/2000 | Blank et al. | |
| 6,174,020 | B1 | 1/2001 | Knettle et al. | |
| 6,423,901 | B2 | 7/2002 | Richter | |
| 6,492,592 | B1 * | 12/2002 | Murofushi et al. | 174/72 A |
| 6,550,232 | B1 | 4/2003 | Achs et al. | |
| 6,781,058 | B1 * | 8/2004 | DeCicco et al. | 174/72 A |

(Continued)

FOREIGN PATENT DOCUMENTS

| DE | 197 23 837 A1 | 12/1998 |
|---|---|---|
| DE | 198 06 762 A1 | 8/1999 |

(Continued)

OTHER PUBLICATIONS

English language Translated Description and Claims of DE 198 06 762, European Patent Office's esp@cenet.com database, 4pp.
English language Abstract, Translated Description and Claims of DE 197 23 837 A1, European Patent Office's esp@cenet.com database, 3pp.
English language Abstract, Translated Description and Claims of EP 0 173 829 A2, European Patent Office's esp@cenet.com database, 5pp.

(Continued)

*Primary Examiner* — Gregory Strimbu
(74) *Attorney, Agent, or Firm* — Smith Law Office

(57) ABSTRACT

A sliding door system having a sliding door for being moved between a closed position and an open position, and an energy guide chain connected on one end to the sliding door and on the other end to a chassis of the vehicle. Electrical lines are disposed in and guided by the energy guide chain for transmitting electricity to components arranged in the sliding door. A curved region is formed between the ends of the energy guide chain, which moves with the sliding door and changes its radii of curvature depending on the position of the sliding door.

9 Claims, 2 Drawing Sheets

U.S. PATENT DOCUMENTS

| | | | |
|---|---|---|---|
| 6,787,702 B2 * | 9/2004 | Suzuki | 174/72 A |
| 6,818,827 B2 * | 11/2004 | Kato et al. | 174/72 A |
| 6,881,902 B2 * | 4/2005 | Aoki et al. | 174/72 A |
| 2002/0005014 A1 * | 1/2002 | Doshita et al. | 49/360 |
| 2002/0014348 A1 | 2/2002 | Aoki et al. | |
| 2004/0003543 A1 * | 1/2004 | Kobayashi et al. | 49/360 |
| 2004/0250525 A1 | 12/2004 | Kobayashi | |

FOREIGN PATENT DOCUMENTS

| | | |
|---|---|---|
| DE | 199 05 022 A1 | 8/2000 |
| EP | 0 173 829 A2 | 3/1986 |
| EP | 1 010 558 A2 | 6/2000 |
| EP | 1 378 400 A1 | 1/2004 |
| JP | 47136 | 2/1996 |
| JP | 2002-144876 | 5/2002 |
| JP | 2004 40862 | 5/2004 |

OTHER PUBLICATIONS

English language Patent Abstracts of Japan, JP 2004 40862, European Patent Office, 1p.

English translation of Office Action issued by Japanese Patent Office for corresponding Japanese Application No. 2006-529 979 dated Jun. 15, 2010, 2pp.

English translation of JP 47136, 6pp.

English translation of JP 2002-144876, 13pp.

English language Abstract, Translated Description and Claims of DE 199 05 022 A1, European Patent Office's esp@cenet.com database, 5pp.

English translation of Office Action and pending claims from corresponding Chinese Patent Application No. 20040026747.9, 6pp.

* cited by examiner

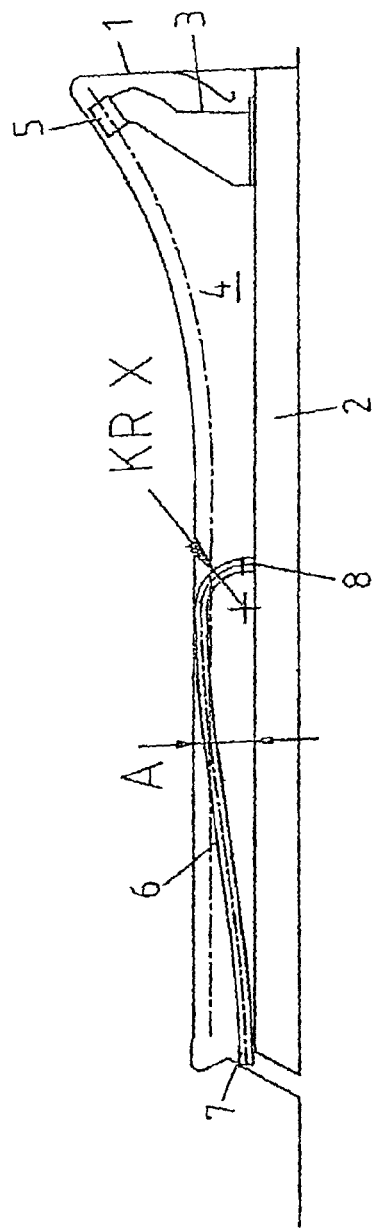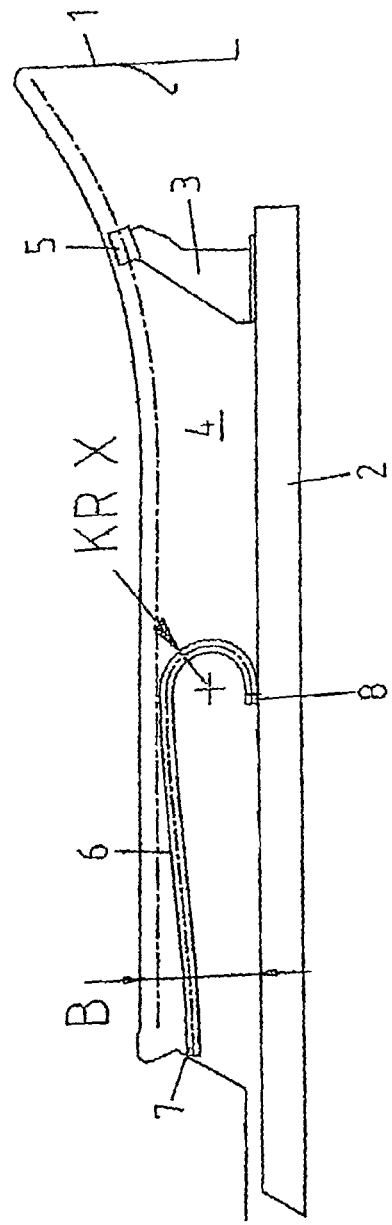
Fig. 1
Fig. 2

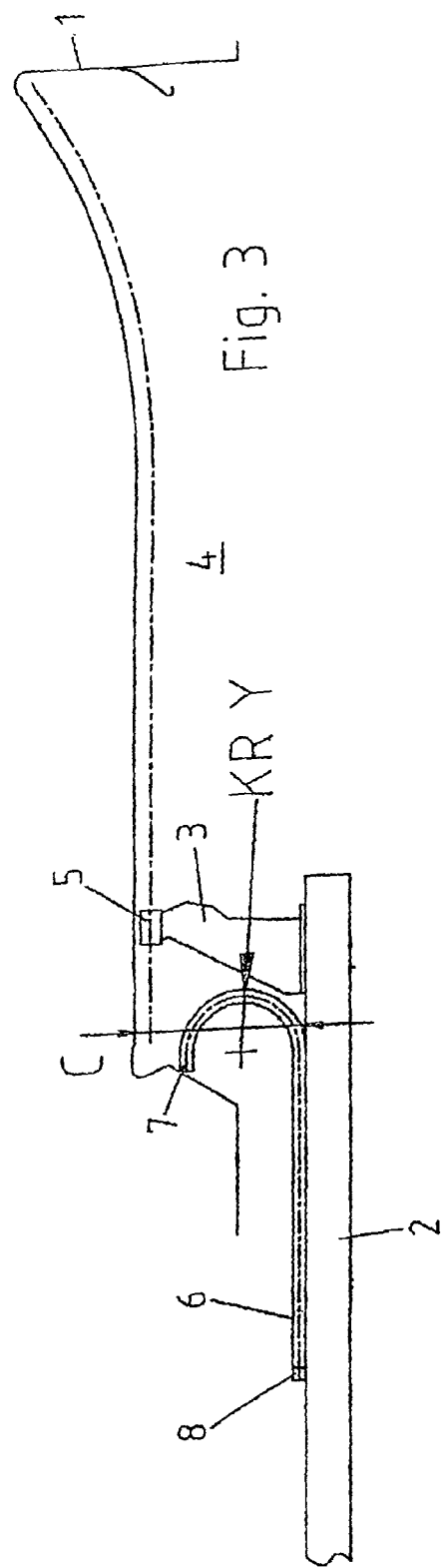

SLIDING DOOR SYSTEM FOR A VEHICLE IN PARTICULAR FOR A MOTOR VEHICLE WITH AN ENERGY SUPPLY GUIDE CHAIN

FIELD AND BACKGROUND OF THE INVENTION

The present invention relates to a sliding door system for a vehicle, and includes an energy guide chain for guiding and protecting electrical wiring for components mounted in the sliding door.

Sliding door systems for a vehicle, especially for a motor vehicle, have been known for a long time.

The motor vehicle can be a transport vehicle or a personal motor vehicle, which is also designated as van, minivan or microvan. Such a vehicle has at least one sliding door which is arranged so that it can be moved essentially in the longitudinal direction of the vehicle. For this purpose, the chassis of the vehicle has suitable guide means. These means can be roll guides in which rolls that are connected with the sliding door on an arm, are arranged. Roll guides for a sliding door, especially for motor vehicles, are known through DE 197 23 837 A1. In connection with the activation devices for a sliding door, especially for motor vehicles, reference is also made to the disclosure content of DE 198 06 762 A1.

Problems exist with regard to the energy supply of electrical components mounted in the sliding door. The electrical component can be, for example, a loudspeaker, an electrically activatable window opener or electrically activatable closing mechanisms. This problem has already been known. Through EP1 010 558 A2, a sliding door system is known for a vehicle, especially for a motor vehicle, which had an energy guide chain which was connected at one end to the sliding door and at the other end to the chassis of the vehicle. Lines were guided in the energy guide chain from the chassis to the sliding door. The energy guide chain was designed so that it could be deflected sideways, so that the energy guide chain follows the nonlinear line movement of the sliding door during an opening or a closing process.

The energy guide chain is arranged in the bottom region of the chassis of the vehicle. For this purpose, it is necessary that sufficient space be available for building it in. This is not the case in all vehicles, so that adding subsequent equipment to a vehicle served with an energy guide chain becomes very difficult.

Based on this, the goal of the present invention is to provide a sliding door system for a vehicle, especially for a motor vehicle, through which supply is made possible to components located in a sliding door, especially electrical components, even when space is limited.

SUMMARY OF THE INVENTION

The sliding door system according to the present invention is for a vehicle, especially for a motor vehicle. The vehicle has at least one sliding door, which can be moved between a closed position and an open position. The system has at least one energy guide chain which can be connected at one end to the sliding door and at the other end to a chassis of the vehicle. The energy guide chain may contain a number of different lines, especially electrical lines, so that, for example, an electric component, which is arranged in the sliding door, is connected to an electrical system of the vehicle through an electrical line, which is guided in the energy guide chain. The energy guide chain has at least one curved region lying between the ends. The sliding door system according to the invention is characterized by the fact that, depending on the position of the sliding door, the curved region has different radii of curvature. Through this design of the sliding door system according to the invention, the possibility is created of adjusting the sliding door system to different vehicles. This is especially provided by the fact that then the energy guide chains can achieve very good adjustment to the existing spatial conditions. Therefore, there is also a possibility of equipping already existing vehicles with a sliding door with the sliding door system according to the invention.

According to an advantageous embodiment of the sliding door system, it is proposed that the area of curvature in the closed position has a radius of curvature which is different from the radius of curvature in the open position of the sliding door. Preferably, the radius of curvature in the closed position is smaller than the radius of curvature in the open position of the sliding door.

As a result of the fact that the radius of curvature depends on the position of the sliding door, the energy guide chain can follow the nonlinear movement of the sliding door. In the closed position, the sliding door energy guide chain has a curved region, preferably with the lowest value for the radius of curvature. In this position, the spatial requirement for the energy guide chain is very low. When the sliding door is opened in the longitudinal direction of the vehicle to the maximum state of opening, the energy guide chain follows the opening process in such a way that the radius of curvature is changing. Preferably, this radius of curvature increases, especially the radius of curvature reaches its maximum value in the open position of the sliding door. Through this measure, excessive stress on the energy guide chain is avoided. On the other hand, the energy guide chain preferably does not come in contact with the components on the surface of the vehicle chassis.

According to a still other advantageous embodiment of the sliding door system, it is proposed that the ratio of the radius of curvature in the closed state to the radius of curvature in the open state be smaller than 0.9, preferably smaller than 0.8, especially smaller than 0.5. At these values, we are dealing with preferred embodiments of the ratios of the radius of curvature in the closed position and the radius of curvature in the open position, but other values can also be possible and advantageous. This ratio can also be dependent on the available space conditions and/or on the construction of the chassis of a vehicle, as well as on the course movement of the opening process or closing process of the sliding door.

The change of the radius of curvature in the curved region, depending on the position of the sliding door, can be done continuously or discontinuously. Here, one can deal with an increase and/or decrease of the radius of curvature. In order to simplify the design of the sliding door system, it is proposed that the energy guide chain have at least two sections which are designed in such a way that, depending on the position of the sliding door, the curved region has different radii of curvature in each section. Through this advantageous further development of the sliding door system, a simplified manufacture of it is achieved, since essentially one has to use two different chain link types.

The length of the sections can be different, especially if it is proposed that the ratio of the two sections to one another be smaller than 0.8, preferably smaller than 0.6, especially smaller than 0.5. Here, too, the ratio of the lengths of the sections can assume different values, where the number and the length of the sections are adjusted to the concrete embodiment of the vehicle in combination with the sliding door system.

The energy guide chain, which has the sliding door system, includes chain links which are connected to one another pivotably and where the chain links have stops for limiting the pivot angle and the chain links have at least two sections with differently designed stops. The radius of curvature in the curved region section is determined by the stops.

Here, a design of the energy guide chain, with which the stops represent an integral component of the chain links, is preferred. In order to adjust the sliding door system to different cases of application, it is also proposed that the stops be connected to the chain links so that they can be separated.

According to still another advantageous embodiment of the sliding door system, it is proposed that the energy guide chain be movable in an essentially horizontal plane. Here, we are dealing with an essentially lying-down arrangement of the energy guide chain.

According to still another advantageous embodiment of the sliding door system according to the invention, it is proposed that the energy guide chain be at least partly designed and manufactured from at least one plastic.

Furthermore, the goal of the invention is to provide a vehicle which has at least one sliding door system, where the design of the sliding door system should be achieved with simple means.

Another goal of the invention is an energy guide chain with a multiplicity of pivotably linked chain links which form a curved region lying between a first trunk and a second trunk, characterized by the fact that the curved region has different radii of curvature, depending on the movement path.

Other advantages and details are explained with the aid of the practical examples shown in the drawing, without limiting the object of the invention to the concrete practical examples.

BRIEF DESCRIPTION OF THE DRAWINGS

FIG. 1 shows a schematic top view of a cross-section of a vehicle with a sliding door system in a closed position according to the present invention, FIG. 2 shows schematically the sliding door system according to FIG. 1 in a partially opened position, and FIG. 3 shows the sliding door system according to FIG. 1 in the completely opened position.

DETAILED DESCRIPTION OF THE PREFERRED EMBODIMENTS

The chassis 1 is designed so that it has a receptacle 4 for a sliding door 2. In the closed position of sliding door 2, as it is shown in FIG. 1, the sliding door 2 penetrates into receptacle 4.

A carrier arm 3 is provided for holding and guiding sliding door 2. The carrier arm 3 extends essentially perpendicularly from the sliding door in the direction of receptacle 4. At its free end, carrier arm 3 has at least one guiding means, especially a roll 5. The roll 5 is guided within a guide, which is not shown, and which is connected with chassis 1. The sliding door 2 can have at least one other carrier arm, too, which is guided in a corresponding guide. This guide can be, for example, in the roof support on a sidewall of the vehicle. The receptacle 4 has a depth A, which is specific to the vehicle.

An energy guide chain 6 is arranged within receptacle 4. The energy guide chain 6 is connected with an end on a fixed point 7, which lies on chassis 1. The energy guide chain 6 is connected to the sliding door through a carrier 8.

The length of the energy guide chain 6 as well as the fixation of carrier 8 on the sliding door 2 is chosen so that the sliding door 2 can be opened completely without the energy guide chain 6 hindering or limiting the opening process.

In the closed position of sliding door 2, as shown in FIG. 1, the energy guide chain 6 has a curved region which has a radius of curvature KRX. During the opening process of the sliding door, it is removed from receptacle 4, and is shifted in the longitudinal direction of the vehicle chassis. During this process, the depth of receptacle 4 increases. FIG. 2 shows a partially opened sliding door 2, where the depth of the receptacle 4 is designated with B. The depth B is greater than the depth A. The increase is dependent of the path of movement of sliding door 2 on the curved track of roll 5. With increasing degree of opening of the sliding door, the depth of the receptacle 4 increases. In the completely opened position of sliding door 2, as is shown in FIG. 3, receptacle 4 has reached its depth C.

The energy guide chain 6 follows the movement of sliding door 2. Depending on the position of sliding door 2, the energy guide chain 6 has different radii of curvature. In the closed position, the curved region has a radius of curvature KRX. In the open position of sliding door 2, the radius of curvature is designated as KRY. These radii of curvature in the end positions of the sliding door are different. In the closed position, the radius of curvature KRX is smaller than the radius of curvature KRY in the open position of the sliding door.

For this purpose, the energy guide chain has at least two sections, which are designed so that, depending on the position of sliding door 2, the curved region has different radii of curvature. The ratio of the two sections lies in a preferred range of approximately 0.5 in the practical example shown.

With the present invention, the existing space of receptacle 4 is used for incorporating an energy guide chain 6, without additional measures being required for accommodating the energy guide chain 6 within the chassis or the sliding door. As a result of the fact that the energy guide chain is designed so that it has different radii of curvature depending on the position of the sliding door, it is ensured that the energy guide chain follows the movement of the sliding door, which is not along a straight line. The invention is especially for sliding door systems which are suitable for being used in vehicles. However, this is not absolutely necessary. The fundamental ideas of the invention can be used also in other sliding door systems, for example, in gate systems. The invention also makes it possible to enable subsequent incorporation into sliding door systems in a cost-effective manner. The energy guide chain can also be designed differently. It can consist of individual chain links which are linked together pivotably. It is also possible to build the energy guide chain through segmented strands. The radius of curvature KR can also be varied with different designs of the stops.

The energy guide chain 6, is illustrated in FIGS. 1 through 3 as bending in only one direction.

The invention claimed is:

1. A sliding door system for a vehicle, wherein the vehicle has a chassis and a sliding door that is movable on the chassis between a fully closed position and a fully open position, and the sliding door system comprises:
a carrier non-movably fixed to the sliding door;
an energy guide chain having a first end directly connected to the carrier for movement with the sliding door from the fully closed position to the fully open position and, a second end non-movably fixed to the chassis, the energy guide chain between the first end and the second end is not connected to the chassis or the sliding door; the energy guide chain further having a bending region adjacent the sliding door that adjusts and bends in only a single direction to define a first radius of curvature when the sliding door is in the fully closed position and a second radius of curvature when the sliding door is in the fully open position, and the first radius of curvature is smaller than the second radius of curvature.

2. The sliding door system for a vehicle according to claim 1, wherein:
the carrier is joined to a central portion of the sliding door.

3. The sliding door system for a vehicle according to claim 1, wherein:
the first end of the energy guide chain and the second end of the energy guide chain are spaced apart a first distance when the sliding door is in the fully open position and are spaced apart a second distance when the sliding door is in the fully closed position, and the first distance is smaller than the second distance.

4. The sliding door system for a vehicle according to claim 1, wherein:
a ratio of the first radius of curvature to the second radius of curvature is less than about 0.9.

5. The sliding door system for a vehicle according to claim 1, wherein:
a ratio of the first radius of curvature to the second radius of curvature in the open position of the sliding door is less than about 0.8.

6. The sliding door system for a vehicle according to claim 1, wherein:
a ratio of the first radius of curvature to the second radius of curvature is less than about 0.5.

7. The sliding door system for a vehicle according to claim 1, wherein the energy guide chain further comprises:
a first section in which the first radius of curvature is formed when the sliding door is in the fully closed position; and
a second section in which the second radius of curvature is formed when the sliding door is in the fully open position.

8. The sliding door system for a vehicle according to claim 1, wherein the energy guide chain further comprises:
a first section in which the first radius of curvature is formed when the sliding door is in the fully closed position; and
a second section in which the second radius of curvature is formed when the sliding door is in the fully open position, and wherein the first section has a length that is shorter than a length of the second section.

9. The sliding door system for a vehicle according to claim 7, wherein the energy guide chain first section prevents the energy guide chain first section from curving to a radius of curvature less than the first radius of curvature; and the energy guide chain second section prevents the energy guide chain second section from curving to a radius of curvature less than the second radius of curvature.

* * * * *